Apr. 17, 1923.
O. W. HOWARD
CONTROLLING MECHANISM FOR TRACTORS
Filed Aug. 5, 1920
1,452,296
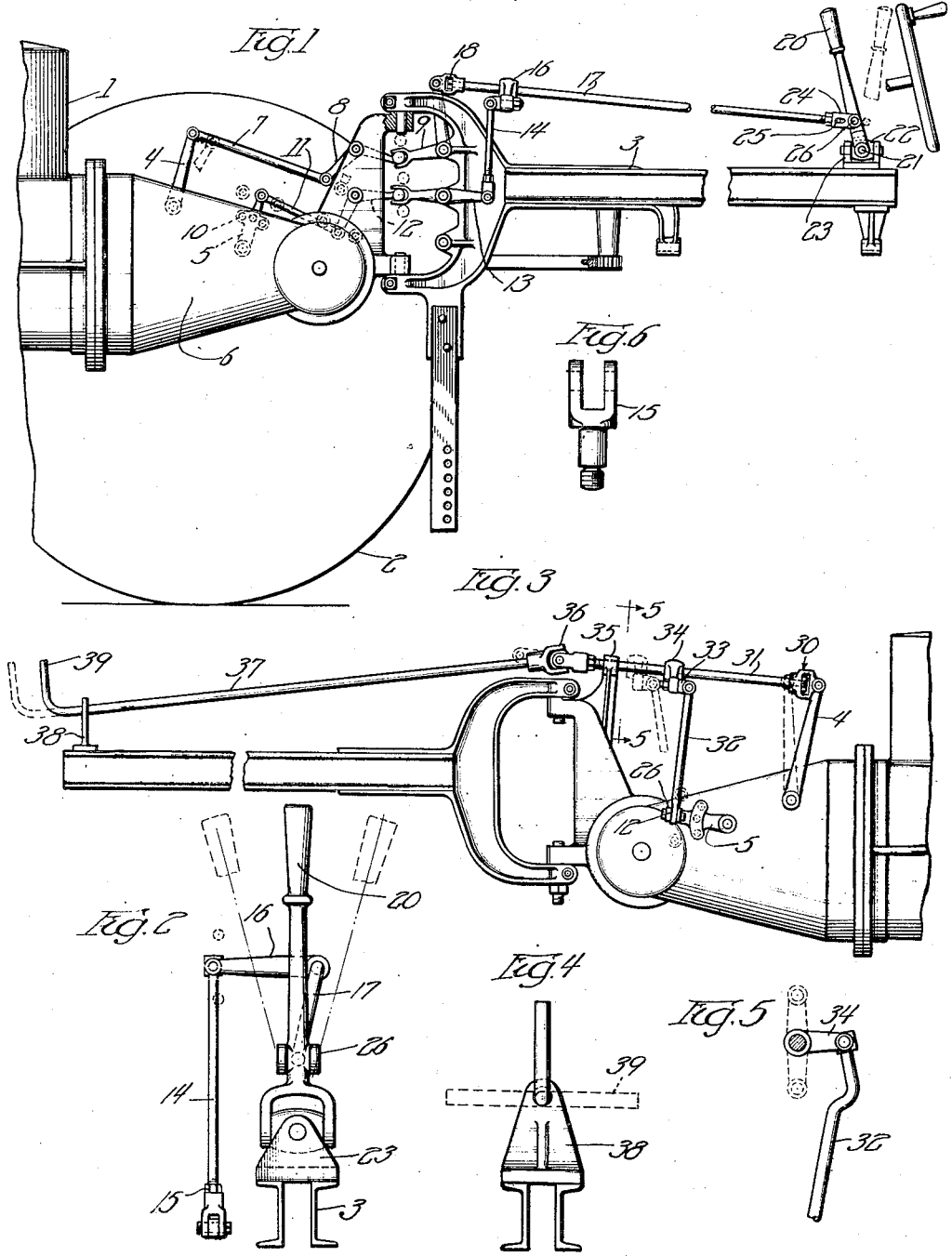

Patented Apr. 17, 1923.

1,452,296

UNITED STATES PATENT OFFICE.

OTIS W. HOWARD, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

CONTROLLING MECHANISM FOR TRACTORS.

Application filed August 5, 1920. Serial No. 401,440.

*To all whom it may concern:*

Be it known that I, OTIS W. HOWARD, a citizen of the United States, residing at Moline, county of Rock Island, State of Illinois, have invented certain new and useful Improvements in Controlling Mechanism for Tractors, of which the following is a specification.

The invention relates to controlling mechanism for tractors.

Tractors are usually provided with clutch and transmission mechanism arranged so that the clutch must be disengaged before the transmission gears are operated. Separate controls for each of these mechanisms are generally employed. In addition to these two controls there is usually the steering wheel, a throttle, and a spark control, all of which must be manipulated by the operator. Two wheel tractors of the unstable type which have coupling frames pivoted to them so as to swing about a vertical axis have the controlling mechanism mounted on the coupling frame and extending forward to the tractor through a bell crank lever and ball and socket connection or other suitable mechanism making the controls flexible so that they will swing with the coupling frame. The control levers are then mounted near the rear of the coupling frame where each must be manipulated by the operator. The present invention has been devised to simplify the controls of a tractor and it is particularly applicable to controls of a two wheel tractor of the type above mentioned.

One of the objects of the invention is to combine two of the controls in such a way that they may be easily manipulated by a single lever.

A further object is to provide a simplified control which may be used with tractors of the type now on the market without requiring any substantial alterations in the existing control mechanism.

A more particular object is to combine the clutch and transmission controls so that the two may be readily controlled by a single lever.

Other objects and advantages of the invention will appear from the specification and drawings.

Two embodiments are illustrated in the accompanying drawings in which,

Figure 1 is a side elevation showing the control mechanism applied to a two wheel tractor of the unstable type.

Figure 2 is an end view of the control lever shown in Figure 1.

Figure 3 is a side elevation of a modification of the control mechanism applied to a two wheel tractor of the unstable type.

Figure 4 is an end view of the controlling rod shown in Figure 3.

Figure 5 is a section on the line 5—5 of Figure 3.

Figure 6 is a plan view of a forked shoulder bolt used with the control mechanism.

The tractor comprises a power unit 1 supported by drive wheels 2 and a coupling unit or frame 3 pivoted to the tractor to swing about a substantially vertical axis for steering purposes. This coupling unit also serves to stabilize the tractor and connect it to an implement or other device to be drawn. The tractor also has a clutch mechanism operated by a lever 4 and a transmission mechanism operated by a lever 5, both of said mechanisms being enclosed within a housing 6 as illustrated in Figure 1.

The clutch is normally biased into engaged position so that the operating lever 4 occupies the full line position illustrated but this lever may be moved to the dotted line position shown for disengaging the clutch. The lever 4 is controlled by means of a rod 7 connected to a bell crank lever 8 having a ball and socket connection with a second bell crank lever 9. The ball and socket connection is in approximate vertical alignment with the axis of the pivot of the coupling frame to the tractor so that the frame may be swung about its axis without interfering with the controls. When the vertically extending arm of the bell crank lever 9 is pulled backward, the other levers are operated so as to move the lever 4 to the dotted line position to disengage the clutch. This has been heretofore done by connecting a rod to the bell crank lever and pulling the rod backward.

The transmission mechanism or reverse gear is preferably arranged to be moved to three positions, namely, neutral, forward and reverse. The full line position of the controlling lever 5 in Figure 1 corresponds to the neutral position and it is releasably held in any one of its three positions by means of a suitable detent not shown, co-operating with depressions or notches illustrated in dotted lines. The lever 5 is connected by a link 11 to a bell crank lever 12 having a ball and socket connection for the purpose above described in connection with lever 9.

It has heretofore been customary to use a bell crank lever in place of the lever 13 and to have such lever operated by means of a rod extending to the rear of the coupling frame. The reverse gears were consequently operated independently of the clutch mechanism and, since it is necessary for the operator to hold the clutch out while shifting the gears, both hands were required for the control of these two mechanisms. As a result the steering wheel and other controls could not be manipulated or adjusted while the gears were being shifted.

The present construction combines these two controls into one in the following manner:

The lever 13 has pivoted thereto one end of a link 14 adjustable at the point 15, the other end of which is pivoted to a shoulder bolt pivoted to a lever 16 fixed on a controlling rod 17. Rotative movements of the rod 17 swing the lever 16, link 14, lever 13, lever 12, and link 11 to shift the transmission control lever 5 to its various positions.

The controlling rod 17 is also connected to the bell crank lever 9 of the clutch control by means of a connecting head 18 in which the end of the rod is swiveled and which is pivoted to the upstanding arm of the bell crank lever 9. Reciprocating movements of the rod 17 are consequently transmitted to the bell crank lever 9 and through its various connections to the clutch control lever 4 but rotative movements of the control rod are not transmitted since the rod is swiveled in the head 18. The reciprocatory movements of rod 17 are not transmitted to the transmission control because the link 14 is pivoted at both ends and simply swings about its pivots when the rod is reciprocated.

The control rod 17 is preferably given its reciprocatory movement by means of a single lever 20 pivoted at 21 to a swiveled head 22 pivoted in the bracket 23 preferably mounted on the coupling frame. This permits the lever 20 to be moved forward and backward and to be swung to either side. The lever is connected to the control rod 17 by means of a bifurcated head 24 having a screw threaded opening for the reception of the rod. The head has a slot 25 and the end of the rod has a hole for the reception of a pin 26. By removing the pin, the rod may be turned to adjust its length and then the hole may be made to coincide with the slot and the pin reinserted to hold the rod in its adjusted position. Any other suitable mechanism for securing an adjustable pivoted connection may be employed.

The mechanism operates as follows:

The neutral position of the parts is shown in full lines in Figure 1. In this position, the clutch is engaged and the gears in neutral.

When it is desired to drive the tractor either forward or backward, the operator grasps the lever 20 and pulls backward. This movement is transmitted to the bell crank lever 9 and forward to the clutch mechanism but it does not affect the connections to the transmission. Pulling the lever backward disengages the clutch after which the gears may be shifted and, to accomplish the latter, the lever is swung around to the right or left depending upon whether it is desired to go forward or backward. The swinging movement imparts a twisting movement to the control rod 17 which rotates through approximately the same number of degrees that the control lever is swung to either side. The two positions of the lever 16 connected to the control rod are illustrated by dotted lines in Figure 2. The swinging movement of the levers shifts the gears after which it may be moved forward again and the clutch engaged to drive the tractor in the direction desired.

This construction permits the operator to always have one hand free for manipulating the steering wheel or other controls. He can have perfect control with one hand of the driving of the tractor, as for example, the left hand, and keep the other hand on the steering wheel.

The mechanism for accomplishing this result is extremely simple and it can be applied to existing constructions of the general type shown in Figure 1 without any substantial alterations. It is merely necessary to either straighten the bell crank lever usually used to control the transmission mechanism, or to substitute a straight lever such as the lever 13, provide the connections 14, 15 and 16 and the swiveled head 18 and then mount the control lever 20 so that it can be moved in two planes. The exact form of the various parts to be substituted can be varied to suit the requirements as long as they accomplish the functions above set forth.

A modification is illustrated in Figures 3, 4 and 5. Instead of having two sets of controlling levers passing from the coupling frame to the tractor, the controlling levers are mounted forward on the tractor and the control rod for operating them is provided with a universal joint for securing flexibility between the coupling frame and the tractor.

The clutch control lever 4 is connected by swivel head 30 to a rod 31 and the transmission control lever 5 is connected by a link 32, a shoulder bolt 33 and a lever 34 to the same rod 31. The rod is preferably supported in a bracket 35 on the tractor frame and connected by universal joint 36 to a control rod 37 slidably and rotatably mounted in a bracket 38 on the coupling frame. A bent up end forms a handle 39 for manipulating the rod.

The control handle 39 can be moved backward to the dotted line position, such motion being transmitted to the clutch mechanism through the lever 4, but not to the transmission mechanism because of the pivotal connection to the link 32. The handle 39 may also be rotated to the right or left as illustrated in Figure 4, such rotative movement being transmitted to the transmission mechanism through the connections, 32, 33 and 34 but not to the clutch mechanism because of the swivel connection to the head 30.

The universal coupling 36 is preferably located substantially in line with the axis of the pivot of the coupling frame to the tractor when the clutch is engaged. When it is disengaged the coupling is drawn slightly to the rear of this position but not enough to interfere with the operation of the controls or to move them to any substantial extent, even though the tractor is turned while the coupling is in this position.

The rod 32 connecting the transmission control lever 5 with the lever 34 is preferably bent as shown in Figure 5 so as to clear the rod 31 when moved to its upward position.

This modification permits easy rotative movement of the control rod through almost 180 degrees and consequently a long control handle is not required since the connecting links between the control rod and the transmission can be made of such a length to permit the leverage to be sufficient so that the operator can easily control the mechanism by means of a handle of substantially the length illustrated in Figure 3.

It has been found that, with a mechanism of this character, the resistance of the transmission to operation while the clutch is engaged, is sufficient to prevent the operator from manipulating the transmission while the clutch is engaged. He will find it necessary to pull the lever backwards before he can operate the transmission gears. It is to be understood, however, that a slotted plate can be used with the control lever 20 if desired in order to insure that the operator will manipulate the lever in the desired manner.

The mechanism has been shown applied to a tractor of the unstable type and it is most suitable for use with a tractor of this type but it is not necessarily limited to such use since it could be employed on a tractor of any type having controls of the character described. It will also be clear that it need not necessarily be applied to the control of a clutch and transmission but can be used for controlling other mechanism, the manipulation of which by a single lever is desirable.

It is also to be understood that the structure shown is for purposes of illustration only and that various changes can be made in the details without departing from the spirit and scope of the invention as defined in the appended claims.

What I claim is:

1. A tractor having a power plant, clutch mechanism, transmission mechanism, a coupling frame extending rearwardly, a lever positioned near the rear of the coupling frame and mounted so as to be movable in two planes, and controlling means connecting the lever with the tractor mechanisms so that movements of the lever in one plane operate the clutch, and movements in another plane operate the transmission.

2. A front wheel drive tractor having a power plant, clutch mechanism, transmission mechanism, a coupling frame pivoted to the tractor to swing about a substantially vertical axis for steering purposes, a lever positioned near the rear of the coupling frame and mounted so as to be movable in two planes, and controlling means connecting the lever with the tractor mechanisms so that movements of the lever in one plane operate the clutch and movments in another plane operate the transmission.

3. A front wheel drive tractor having a power plant, clutch mechanism, transmission mechanism, a coupling frame pivoted to the tractor to swing about a substantially vertical axis for steering purposes, a lever positioned near the rear of the coupling frame and mounted so as to be movable in two planes, and connections between the lever and the tractor mechanisms, said connections including devices serving to operate the clutch mechanism without disturbing the transmission when the lever is moved in one plane and serving to operate the transmission without disturbing the clutch when the lever is moved in the other plane.

4. A front wheel drive tractor having a power plant, clutch mechanism, transmission mechanism, a coupling frame pivoted to the tractor to swing about a substantially vertical axis for steering purposes, a lever mounted on the coupling frame near the rear thereof and movable in different planes, and controlling means connected to the lever and extending forward by means flexible in substantially vertical alignment with the pivot of the coupling frame to the tractor and connected to the tractor mechanisms, said controlling means serving to operate the transmission when the lever is moved in one direction and to operate the clutch when the lever is moved in another direction.

5. A front wheel drive tractor having a power plant, clutch mechanism, transmission mechanism, a coupling frame pivoted to the tractor to swing about a substantially vertical axis for steering purposes, controlling means extending forward from the coupling frame to the tractor and including connections flexible in substantially vertical alignment with the pivot of the coupling frame to the tractor and connected to the tractor mechanisms, said controlling means also including a rod mounted so as to be operable from a point near the rear of the coupling frame, the controlling means being so constructed that when the rod is reciprocated the clutch is operated and when the rod is rotated, the transmission mechanism is operated.

6. Control mechanism for a tractor having a clutch mechanism, transmission mechanism and a coupling frame pivoted to the tractor so as to swing about a substantially vertical axis, comprising a rod mounted on the coupling frame arranged to be reciprocated and rotated, connections from the rod to the clutch mechanism so that when the rod is reciprocated, the clutch mechanism is operated, and connections from the rod to the transmission mechanism so that when the rod is rotated, the transmission gears are operated, said control mechanism being flexible so as to permit it to move with the coupling frame without interfering with the control functions.

7. Control mechanism for a tractor having clutch mechanism, transmission mechanism and a coupling frame pivoted to it to swing about a substantially vertical axis, comprising a rod mounted on the coupling frame for both reciprocatory and rotative movements, connections arranged so that when the rod is pulled rearwardly, the clutch is disengaged and when the rod is rotated in one direction, the transmission is operated to drive the tractor in one direction and when rotated in the other direction, the transmission mechanism is operated to drive the tractor in the other direction.

In testimony whereof, I affix my signature.

OTIS W. HOWARD.